United States Patent
Arthur et al.

(10) Patent No.: US 10,366,458 B2
(45) Date of Patent: Jul. 30, 2019

(54) LIVE REPORTING OF CHECK IMAGE KEYING ISSUES

(71) Applicant: Bank of America Corporation, Charlotte, NC (US)

(72) Inventors: William D. Arthur, Fort Mill, SC (US); Shawn Gunsolley, Charlotte, NC (US); Verlon S. Watson, III, Charlotte, NC (US); Eric Dryer, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 268 days.

(21) Appl. No.: 15/446,798

(22) Filed: Mar. 1, 2017

(65) Prior Publication Data

US 2018/0253799 A1 Sep. 6, 2018

(51) Int. Cl.
*G06Q 40/00* (2012.01)
*G06F 11/07* (2006.01)

(52) U.S. Cl.
CPC ......... *G06Q 40/12* (2013.12); *G06F 11/0709* (2013.01); *G06F 11/0784* (2013.01); *G06F 11/0787* (2013.01)

(58) Field of Classification Search
CPC . G06Q 40/12; G06F 11/0784; G06F 11/0787; G06F 11/0709
See application file for complete search history.

(56) References Cited

U.S. PATENT DOCUMENTS

| | | |
|---|---|---|
| 5,120,944 A | 6/1992 | Kern et al. |
| 5,151,948 A | 9/1992 | Lyke et al. |
| 5,237,159 A | 8/1993 | Stephens et al. |
| 5,488,671 A | 1/1996 | Kern |
| 5,678,046 A * | 10/1997 | Cahill ............ G06K 9/033 707/829 |

(Continued)

OTHER PUBLICATIONS

"Best Practices for Check Image Capture Without Traditional Check Scanners". Author: Allmypapers. Retrieved from <https://allmypapers.com/wp-content/uploads/2014/10/Best_Practices_for_Check_Scanning.pdf>. Originally published 2012.*

(Continued)

*Primary Examiner* — Nathan A Mitchell
(74) *Attorney, Agent, or Firm* — Banner & Witcoff, Ltd.; Michael A. Springs (57) ABSTRACT

Aspects of the disclosure relate to live reporting of check image keying issues. A computing platform may receive a first dataset and may transmit a first set of instructions for triggering transaction balancing and the first dataset to a first client computer system. Subsequently, the computing platform may receive from the first client computer system, a request to report an issue. Responsive to receiving the request to report an issue, the computing platform may receive from the first client computer a second dataset relating to the issue. Subsequently, the computing platform may generate, based on the first dataset and second dataset, an issue record, and may store the issue record in a second database. Then, the computing platform may transmit, via the communication interface, a second set of instructions for triggering issue investigation and the issue record relating to the issue to a second client computer system.

20 Claims, 8 Drawing Sheets

(56) References Cited

U.S. PATENT DOCUMENTS

| | | | |
|---|---|---|---|
| 6,032,184 | A | 2/2000 | Cogger et al. |
| 6,105,150 | A | 8/2000 | Noguchi et al. |
| 6,125,196 | A | 9/2000 | Carey et al. |
| 6,286,030 | B1 | 9/2001 | Wenig et al. |
| 6,385,644 | B1 | 5/2002 | Devine et al. |
| 6,859,783 | B2 | 2/2005 | Cogger et al. |
| 6,863,214 | B2 | 3/2005 | Garner, IV et al. |
| 7,609,873 | B2 | 10/2009 | Foth et al. |
| 7,925,555 | B2 | 4/2011 | Likas et al. |
| 7,996,239 | B1 | 8/2011 | Pellican et al. |
| 8,112,357 | B2 | 2/2012 | Mueller et al. |
| 8,234,633 | B2 | 7/2012 | Schneider et al. |
| 8,625,875 | B2 | 1/2014 | Csulits et al. |
| 9,245,249 | B2 | 1/2016 | Buerk et al. |
| 9,317,745 | B2 | 4/2016 | Smith et al. |
| 9,384,393 | B2 | 7/2016 | Smith et al. |
| 9,390,574 | B2 | 7/2016 | Jones et al. |
| 9,529,662 | B1 | 12/2016 | Wangkhem et al. |
| 2004/0133516 | A1* | 7/2004 | Buchanan ............ G06Q 20/042 705/42 |
| 2005/0091130 | A1* | 4/2005 | Phillips ................ G06Q 20/042 705/30 |
| 2005/0108168 | A1* | 5/2005 | Halpin ................. G06Q 20/042 705/45 |
| 2008/0180750 | A1* | 7/2008 | Feldman ................ G06K 9/186 358/3.28 |
| 2009/0240608 | A1* | 9/2009 | Mashinter .............. G06Q 40/00 705/30 |
| 2009/0263004 | A1* | 10/2009 | Hawkins ................ G06Q 20/04 382/139 |
| 2010/0074509 | A1* | 3/2010 | Laaser ..................... G06K 9/03 382/138 |
| 2014/0112571 | A1* | 4/2014 | Viera ..................... G06Q 40/12 382/138 |
| 2014/0279310 | A1* | 9/2014 | Fossella ................. G06Q 40/12 705/30 |
| 2015/0120516 | A1* | 4/2015 | Smith .................... G06Q 40/12 705/30 |
| 2015/0120517 | A1* | 4/2015 | Smith ................... G06Q 20/108 705/30 |
| 2017/0330287 | A1* | 11/2017 | Vogel ................ G06Q 10/0633 |

OTHER PUBLICATIONS

Higgins, Ray. "Ramifications of MICR Mismatch in Check Image Exchange." Retrieved from <https://allmypapers.com/wp-content/uploads/2014/10/amp_wppr_Verify.pdf>. Originally published Oct. 2014.*

"Image Quality: The Quiet Problem That Costs Millions". Author: Digital Check. Retrieved from <https://www.digitalcheck.com/wp-content/uploads/2016/02/DCC-image-quality-full-112014.pdf>. Originally published 2016.*

* cited by examiner

LIVE REPORTING OF CHECK IMAGE KEYING ISSUES

BACKGROUND

Aspects of the disclosure relate to electrical computers, digital processing systems, and multicomputer data transferring. In particular, one or more aspects of the disclosure relate to live reporting of check image keying issues.

Users of computing systems may detect issues such as errors or faults while executing programs. When a user detects such an error, the user may wish to report the issue to an engineering team that developed the computing system. To do this, the user may discuss the issue with the engineering team or write a description of the issue in an email to the engineering team. However, it may be difficult or impossible for the user to accurately and efficiently describe the issue the user detected while using the computing system. The user might not know what the cause of the issue was or might not effectively communicate the issue to the engineering team. This may lead to excessive time spent researching the issue and trying to reproduce the issue by the engineering team.

SUMMARY

Aspects of the disclosure provide effective, efficient, scalable, and convenient technical solutions that address and overcome the technical problems associated with reporting issues that arise when using a computing system. In particular, one or more aspects of the disclosure provide techniques for live reporting of check keying issues for users of a check balancing computing system.

In accordance with one or more embodiments, a computing platform, having at least one processor, a memory, a first database, a second database, and a communication interface communicatively coupled to the at least one processor, may receive, from the first database, a first dataset. Subsequently, the computing platform may transmit, via the communication interface, a first set of instructions for triggering transaction balancing and the first dataset to a first client computer system. Subsequently, the computing platform may receive, via the communication interface, from the first client computer system, a request to report an issue. Responsive to receiving the request to report an issue, the computing platform may receive from the first client computer a second dataset relating to the issue. Subsequently, the computing platform may generate, based on the first dataset and second dataset, an issue record. Subsequently, the computing platform may store the issue record in the second database. Then, the computing platform may transmit, via the communication interface, a second set of instructions for triggering issue investigation and the issue record including first dataset and second dataset relating to the issue to a second client computer system.

In some embodiments, the first dataset includes balancing data including a collection of debits and credits to financial accounts, and at least one image of a check.

In some embodiments, the second dataset includes balancing data includes a collection of debits and credits to financial accounts, and at least one image of a check, the second dataset being representative of the state of the first client computer system at the time of the request to report an issue.

In some embodiments, the first set of instructions for triggering transaction balancing includes instructions for generating a first graphical user interface to facilitate financial transaction balancing.

In some embodiments, the second set of instructions for triggering issue investigation includes instructions for generating a second graphical user interface to facilitate issue investigation, the second set of instructions comprising at least some of the same instructions as the first set of instructions, and the second graphical user interface comprising at least some of the same graphical user interface elements as the first graphical user interface.

In some embodiments, the second set of instructions for triggering issue investigation includes instructions for generating a second graphical user interface to facilitate issue investigation.

In some embodiments, the first set of instructions for triggering transaction balancing includes instructions for generating a first graphical user interface to facilitate financial transaction balancing, the first set of instructions comprising at least some of the same instructions as the second set of instructions, and the first graphical user interface comprising at least some of the same graphical user interface elements as the second graphical user interface.

In some embodiments, the computing platform may receive, via the communication interface, from the second client computer system, a communication. Subsequently, the computing platform may store the communication in the issue database in association with the issue record.

In some embodiments, the computing platform may transmit the communication to the first client computer system via the communication interface.

In some embodiments, the second client computer system does not have permission to write to the first database.

In accordance with one or more additional embodiments, a computing platform comprising at least one processor, memory, a first database, a second database, and a communication interface may receive, from a first database, a first dataset. Subsequently, the computing platform may transmit, via the communication interface, a first set of instructions for triggering transaction balancing and the first dataset to a first client computer system. Subsequently, the computing platform may receive, via the communication interface, from the first client computer system, a request to report an issue. Responsive to receiving the request to report an issue, the computing platform may receive from the first client computer a second dataset relating to the issue. Subsequently, the computing platform may generate, based on the first dataset and second dataset, an issue record. Subsequently, the computing platform may store the issue record in the second database. Then, the computing platform may transmit, via the communication interface, a second set of instructions for triggering issue investigation and the issue record including first dataset and second dataset relating to the issue to a second client computer system.

In some embodiments, the first dataset includes balancing data includes a collection of debits and credits to financial accounts, and at least one image of a check.

In some embodiments, the second dataset includes balancing data includes a collection of debits and credits to financial accounts, and at least one image of a check, the second dataset being representative of the state of the first client computer system at the time of the request to report an issue.

In some embodiments, the first set of instructions for triggering transaction balancing includes instructions for generating a first graphical user interface to facilitate financial transaction balancing.

In some embodiments, the second set of instructions for triggering issue investigation includes instructions for generating a second graphical user interface to facilitate issue investigation, the second set of instructions comprising at least some of the same instructions as the first set of instructions, and the second graphical user interface comprising at least some of the same graphical user interface elements as the first graphical user interface.

In some embodiments, the second set of instructions for triggering issue investigation includes instructions for generating a second graphical user interface to facilitate issue investigation.

In some embodiments, the first set of instructions for triggering transaction balancing includes instructions for generating a first graphical user interface to facilitate financial transaction balancing, the first set of instructions comprising at least some of the same instructions as the second set of instructions, and the first graphical user interface comprising at least some of the same graphical user interface elements as the second graphical user interface.

In some embodiments, the computing platform may receive, via the communication interface, from the second client computer system, a communication. Subsequently, the computing platform may store the communication in the issue database in association with the issue record.

In some embodiments, the computing platform may transmit the communication to the first client computer system via the communication interface.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to live reporting of check image keying issues. In some instances, a check image keying computing platform is configured to facilitate the balancing of check transactions. In one or more arrangements, an issue tracking system may provide one or more issue tracking functions in relation to the check image keying computing platform. A first client computer may be configured to balance check transaction records. A second client computer may be configured to analyze and investigate issues that arise when balancing check transaction records at the first client computer. The first client computer may record a memory state in conjunction with reporting an error, and transmit the memory state to the second client computer for analysis. Furthermore, the first client computer and second client computer may share messages and other information related to the issue or error via the issue tracking system.

Figure 1A:
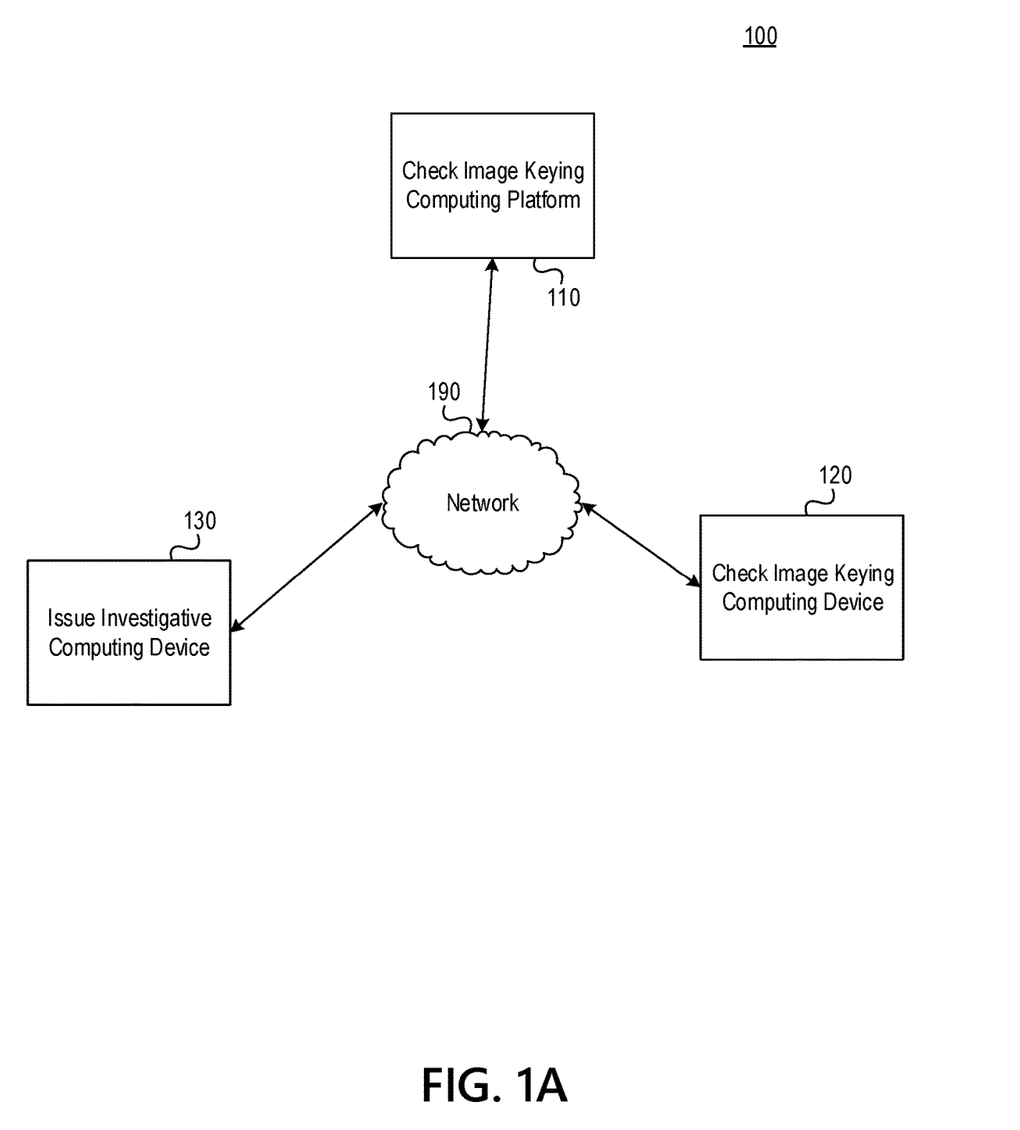
FIGS. 1A and 1B depict an illustrative computing environment for live reporting of check image keying issues in accordance with one or more example embodiments.
Figure 1B:
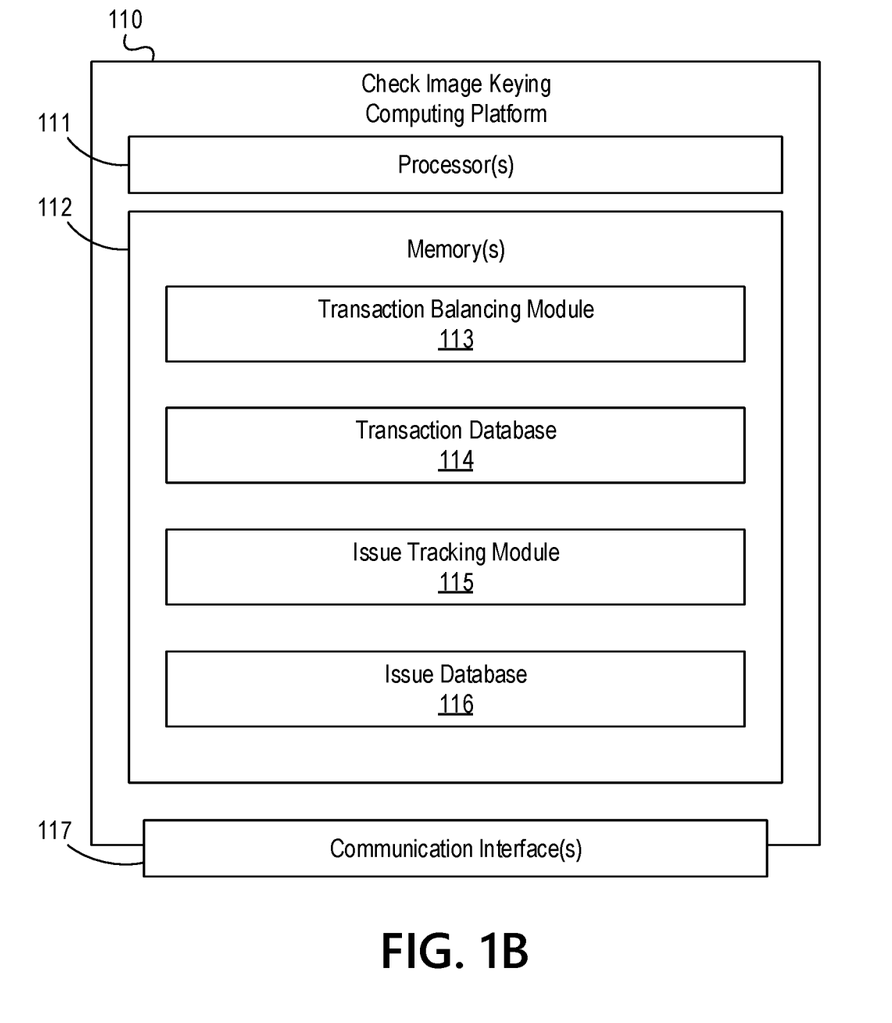

FIGS. 1A and 1B depict an illustrative computing environment for live reporting of check image keying issues in accordance with one or more example embodiments. Referring to FIG. 1A, computing environment 100 may include one or more computing devices and/or other computer systems. For example, computing environment 100 may include a check image keying computing platform 110, a check image keying computing device 120, and an issue investigative computing device 130.

Check image keying computing platform 110 may be configured to facilitate the balancing of check transactions. Check transactions may include, for example, transactions originating from negotiable financial instruments such as checks. Check transactions may, for example, be cleared via an Automated Clearing House (ACH) network. Prior to processing check transactions, however, a banking institution may verify several pieces of data from the paper check to enter data into the ACH system. Examples of such information include, but are not limited to, routing and account numbers, the drawee information, the payee information, the date of issue, the amount of the transaction, the drawer of the check, and the signature of the drawer. Routing and account numbers may be written in magnetic ink, for example in Magnetic ink character recognition code (MICR Code). MICR Code is a specially designed font for optical character recognition of information such as routing and account numbers on checks. The drawee of a check is the bank or other financial institution where the check can be presented for payment. The payee of a check is the destination or recipient of the money represented by the check. The drawer is the person or entity who issued the check, and the drawer may sign the check in a designated spot on the check.

Checks are processed by a combined automated and manual process by some banking institutions. First, a check may be scanned and processed to recognize the information on the check via optical character recognition. For example, the routing and account numbers are able to be read by optical character recognition by virtue of MICR Code. Optical character recognition is also able to recognize other information on the check that might not be written in MICR Code, such as the drawer, the payee, the drawee, the amount, and the drawer. Several issues may arise when this optical character recognition process takes place. For example, when a drawer signs the check, they may write over or otherwise obscure the routing or account numbers at the bottom of the check. Similarly, some checks contain a memo field. A drawer may similarly obscure parts of the routing and account numbers when writing in the memo field of the check. Other hand written information may be too difficult to automatically recognize via optical character recognition. There are many ways in which the automated processing of a paper check may result in inconsistent or otherwise inaccurate data. If any part of the check cannot be processed automatically, or for any other reason the check requires human intervention to clear, a human operator reviews the transaction. Some errors originate from the check image processing process, or are otherwise caused by the automated machinery that processes checks. Other check transaction errors are caused by human error. For example, if a drawer of a check submits a check deposit with a deposit slip indicating a value that is not the same as the value on the check, the transaction will be out of balance. Other examples of conditions that may cause a check transaction to be out of balance could be a mismatch between the amount written in words and the amount written in numbers on the check. Still other various problems may occur during the check clearing process that cause a check transaction to be out of balance. These errors may be of a technical nature with the check clearing system, a human error on behalf of the drawer or the payee, or a human error on behalf of the operators of the check clearing system. In any event, when a check transaction is out of balance, a human operator evaluates the check transaction to attempt to rectify the transaction and put it back into balance if possible. This process is referred to as balancing the transaction.

Check image keying computing device 120 is configured to enable a user to balance check transactions. In some embodiments, the check image keying computing device 120 provides a user interface containing front and back images of the check involved in the transaction, and the metadata that has been recognized from the check images. The metadata associated with the check transaction includes the information written on the check, such as the routing and account numbers, the drawer, the payee, the drawee, the amount, and the drawer. The metadata is, however, in a machine readable format so that the transaction can be processed by computer systems such as the ACH system.

Computing environment 100 also may include one or more networks, which may interconnect one or more of check image keying computing platform 110, a check image keying computing device 120, and an issue investigative computing device 130. For example, computing environment 100 may include network 190. Network 190 may include one or more sub-networks (e.g., local area networks (LANs), wide area networks (WANs), or the like). Network 190 may be associated with a particular organization (e.g., a corporation, financial institution, educational institution, governmental institution, or the like) and may interconnect one or more computing devices associated with the organization. For example, check image keying computing platform 110, a check image keying computing device 120, and an issue investigative computing device 130 may be associated with an organization (e.g., a financial institution), and network 190 may be associated with and/or operated by the organization, and may include one or more networks (e.g., LANs, WANs, virtual private networks (VPNs), or the like) that interconnect check image keying computing platform 110, a check image keying computing device 120, and an issue investigative computing device 130.

Referring to FIG. 1B, check image keying computing platform 110 may include one or more processors 111, memory 112, and communication interface 117. In some instances, the one or more program modules and/or databases may be stored by and/or maintained in different memory units of check image keying computing platform 110 and/or by different computing devices that may form and/or otherwise make up check image keying computing platform 110. For example, memory 112 may have, store, and/or include a transaction balancing module 113, transaction database 114, issue tracking module 115, and an issue database 116. Transaction balancing module 113 and transaction database 114 may store instructions and/or data that cause and/or enable check image keying computing platform 110 to provide one or more transaction balancing functions and/or perform other functions. Issue tracking module 115 and issue database 116 may store instructions and/or data that cause and/or enable check image keying computing platform 110 to provide one or more issue tracking functions and/or perform other functions.

Figure 2A:
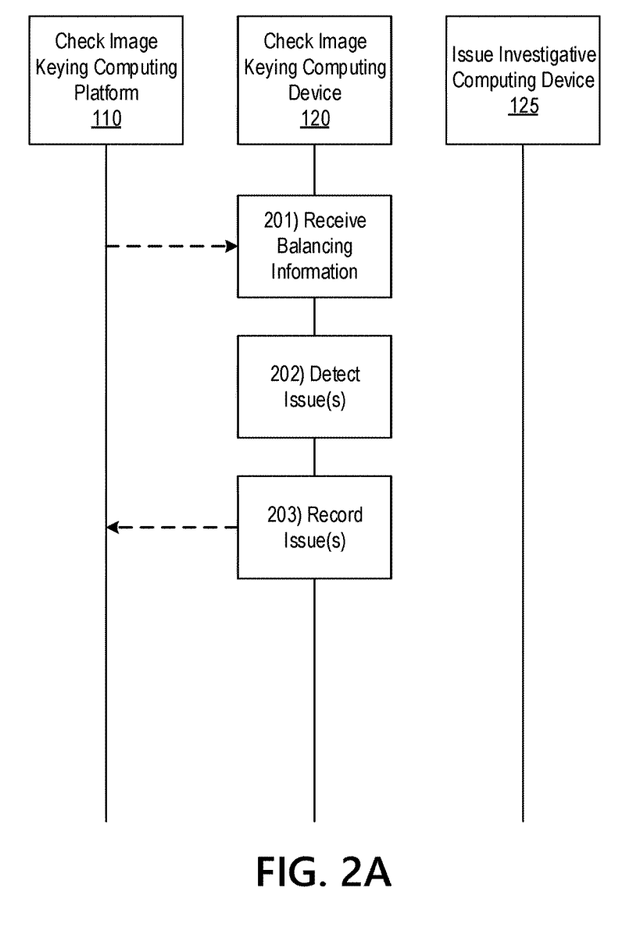
FIGS. 2A and 2B depict an illustrative event sequence for live reporting of check image keying issues in accordance with one or more example embodiments.
Figure 2B:
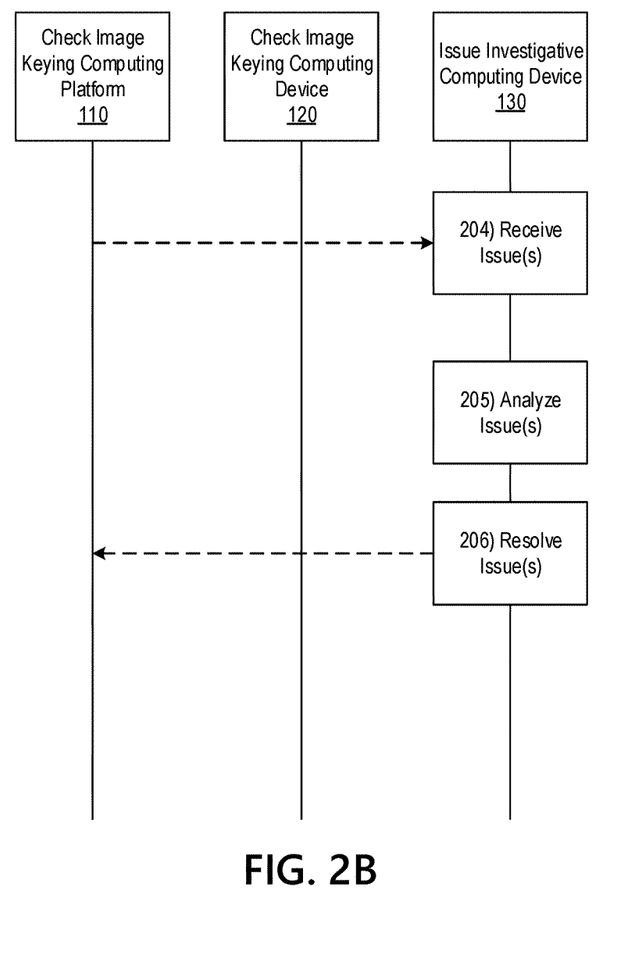

FIGS. 2A-2B depict an illustrative event sequence for live reporting of check image keying issues in accordance with one or more example embodiments. Referring to FIG. 2A, at step 201, check image keying computing device 120 receives balancing information from check image keying computing platform 110. In an embodiment, the balancing information is accessed in transaction database 114. In an embodiment, balancing information contains at least check images and check transaction metadata. The check images may include a front check image and a back check image. The check transaction metadata may include the information written on the check in a machine readable format. Examples of check transaction metadata include, but are not limited to, routing and account numbers, the drawer identification, the payee identification, the drawee identification, the amount of the transaction, and the drawer signature. A user may interact with the check image keying computing device 120 to manually balance the transaction. This process may include, but is not limited to, manually recognizing characters that were not recognized by automated optical character recognition, manually adjusting account numbers, transaction amounts, or other metadata to put the transaction into balance.

At step 202, check image keying computing device 120 may detect an error or issue (e.g., based on the user of the check image keying computing device 120 detecting an error or issue). An error in the balancing operation may include, for example, a software fault, or a human error. For example, the software may erroneously not display the correct check image in the graphical user interface where a check image is expected. Another example of an error is a malformed set of data that is not able to be read by the check image keying computing device 120, and thus the user is unable to complete the transaction balancing operation. In any event, an error at the check image keying computing device 120 stops the balancing operation from completing. The user of the check image keying computing device 120 cannot proceed to balance the check transaction.

At step 203, check image keying computing device 120 generates and submits a request to record the issue (e.g., based on the user of check image keying computing device 120 requesting to record the issue). At this step, the check image keying computing device 120 captures several pieces of data to record the issue. For example, in some instances, the check image keying computing device 120 captures the operator name, the operator standard identifier, the operator email address, the source balancing data, the operator affected balancing data, and any notes the operator enters. The operator name, standard identifier, and email address serve to facilitate communication with the operator to resolve the issue. The source balancing data is a snapshot of the data before it was acted on by the operator. When the check image keying computing device 120 begins a balancing operation, it may make a copy of the input data as a backup. This data is retained in memory as a representation of what data was originally provided to the operator. This data includes, but is not limited to, check image data and check transaction metadata. Similarly, operator affected balancing data represents the data as manipulated by the operator at the time of reporting the issue. In some instances, this data may be captured from memory at the time of the error. This data includes, but is not limited to, check image data and check transaction metadata. However, the operator affected balancing data has been manipulated in some way by the operator at the check image keying computing device 120. In an embodiment, the operator affected balancing data is serialized JavaScript Object Notation (JSON) formatted data produced by a JavaScript program. In other embodiments, the operator affected balancing data may be any other suitable data format.

At step 203, check image keying computing device 120 may record the issue. The check image keying computing device 120 writes a record to a database including the captured data, including but not limited to, the operator name, the operator standard identifier, the operator email address, the source balancing data, the operator affected balancing data, and any notes the operator enters. This data may be formatted in a serialized JavaScript Object Notation (JSON) format, or any other suitable data format. In an embodiment, the issue is recorded in issue database 116. In an embodiment, the issue database 116 is located on network-attached storage (NAS). Issue database 116 may be implemented with any suitable database type, including by not limited to relational or non-relational database formats. Relational databases may include, for example, relational database management system (RDBMS) accessed through a Structured Query Language (SQL) language. Non-relational databases may include, for example, document-oriented databases, or so-called "NoSQL" databases. Issue database 116 may also be implemented as a file system where files, such as JSON files, are stored.

Referring to FIG. 2B, at step 204, issue investigative computing device 130 retrieves the issue from the check image keying computing platform 110. In an embodiment, the issue is retrieved from issue database 116. Issue investigative computing device 130 retrieves and analyzes the issue or issues (e.g., based on a second operator using issue investigative computing device 130 to retrieve and analyze the issue or issues) at step 205. The second operator may be, for example, a member of an engineering team such as a business analyst tasked to design and maintain the operation of check image keying computing platform 110. The issue investigative computing device 130 facilitates analyzing the issue, including the data associated with the issue, to resolve the issue at step 206. The graphical user interface and logic presented by investigative computing device 130 includes graphical user interface elements and logic substantially similar to the graphical user interface and logic generated by the check image keying computing device 120. In an embodiment, the graphical user interface generated by the issue investigative computing device 130 may share at least a portion of code or instructions with the check image keying computing device 120. For example, the differences between the two graphical user interfaces and logical operations is that the issue investigative computing device 130 is not connected to 'live' data in transaction database 114. Rather, the issue investigative computing device 130 enables the engineering team to analyze the working state of the software and the interaction with the actual data captured from the moment the issue or error was detected by an operator at the check image keying computing device 120. In an embodiment, the user interface of the check image keying computing device 120 and the issue investigative computing device 130 is implemented in a web browser using technologies such as but not limited to HTML and JavaScript, or other such web browser technologies. By recreating the user interface as closely as possible to the environment used by the check image keying computing device 120, the engineering team operating the issue investigative computing device 130 is able to step through the operation of the program and better understand the cause of the error or issue. The outcome of the analysis may be, for example, a change to the program code of the check image keying computing platform 110, a change to the check transaction balancing data (e.g., metadata and/or check image data), or a change to the operation of the check image keying computing device 120 by the operator. Throughout the analysis step 205, the engineering team is able to communicate directly with the operator who detected the issue through the check image keying computing platform. For example, because the issue includes identifying information about the operator, the engineering team can initiate a call or email with the operator to aid in resolving the issue. In an embodiment, the engineering team and the operator can communicate via the notes attached to the issue in the issue tracking module 115.

Figure 3A:
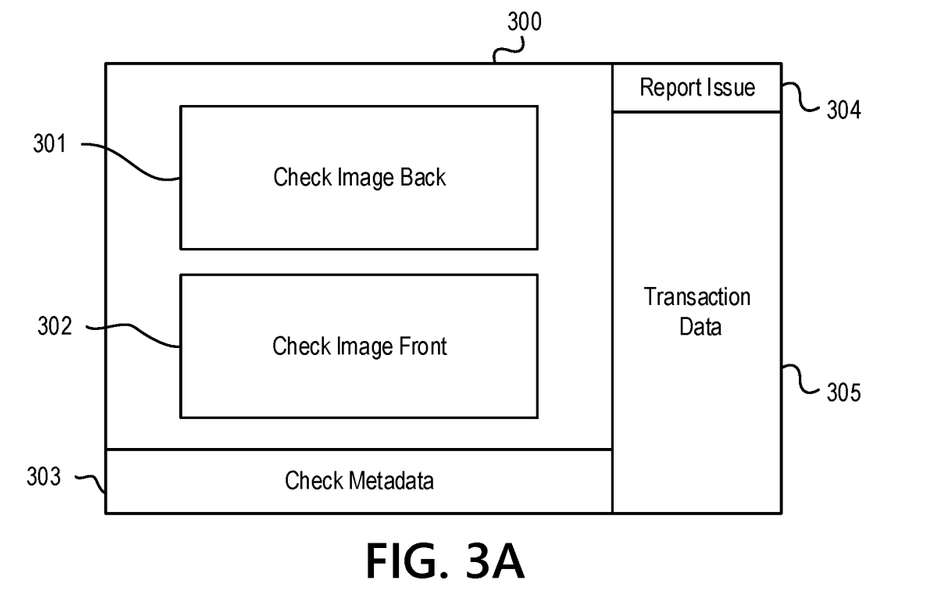
FIGS. 3A and 3B depict example graphical user interfaces for live reporting of check image keying issues in accordance with one or more example embodiments.
Figure 3B:
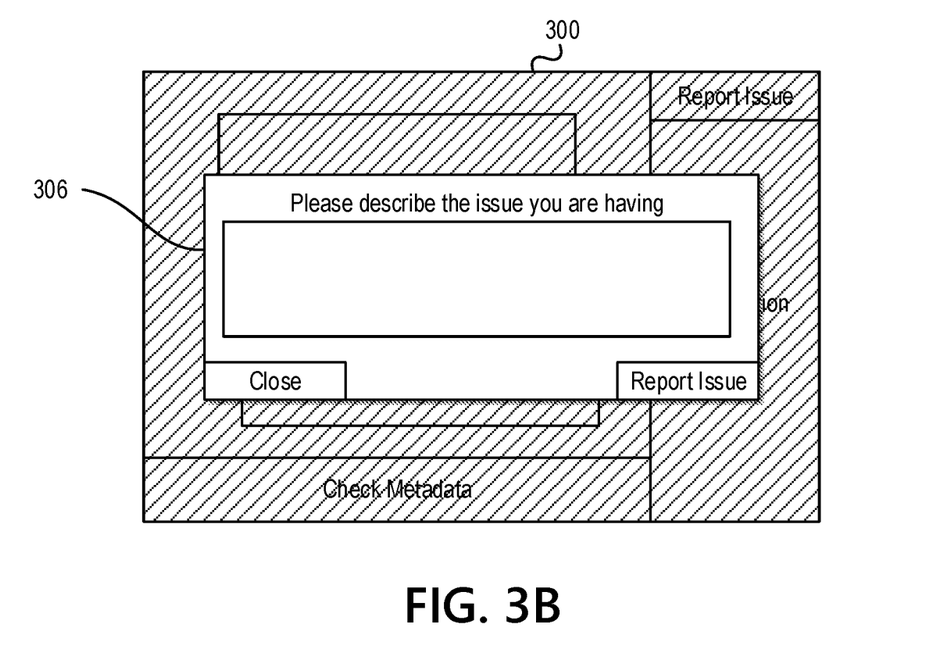

FIGS. 3A-3B depict example graphical user interfaces for live reporting of check image keying issues in accordance with one or more example embodiments. FIG. 3A depicts an example of a graphical user interface 300 of the transaction balancing module 113. In graphical user interface 300, the operator of a check image keying computing device 120 is able to bring a check transaction into balance by analyzing the check images 301 and 302, check metadata 303, and transaction data 305. Check image 301 may be, for example, an image of the back of a check, and check image 302 may be, for example, an image of the front of the same check. Check metadata 303 may include, for example, routing and transit numbers, account numbers, transaction codes, amounts, serial numbers, or other data fields associated with the check transaction. Transaction data 305 may include, for example, the credits and debits to various accounts associated with the check transaction. Report issue 304 button allows the operator of the check image keying computing device 120 to report an issue, initiating the process described in connection with FIG. 2A.

FIG. 3B depicts an example of a graphical user interface 300 after the report issue 304 button is selected by the operator. After the operator selects the report issue 304 button, a dialog box such as a pop-over modal window 306 is displayed. Window 306 requests that the operator enter in any other notes or details that may assist in the analysis of the issue. Then, Window 306 enables the operator to either submit the issue to the issue database 116 or cancel the reporting. If the operator selects to report the issue, the program flow continues as discussed in connection with FIG. 2A.

Figure 4:
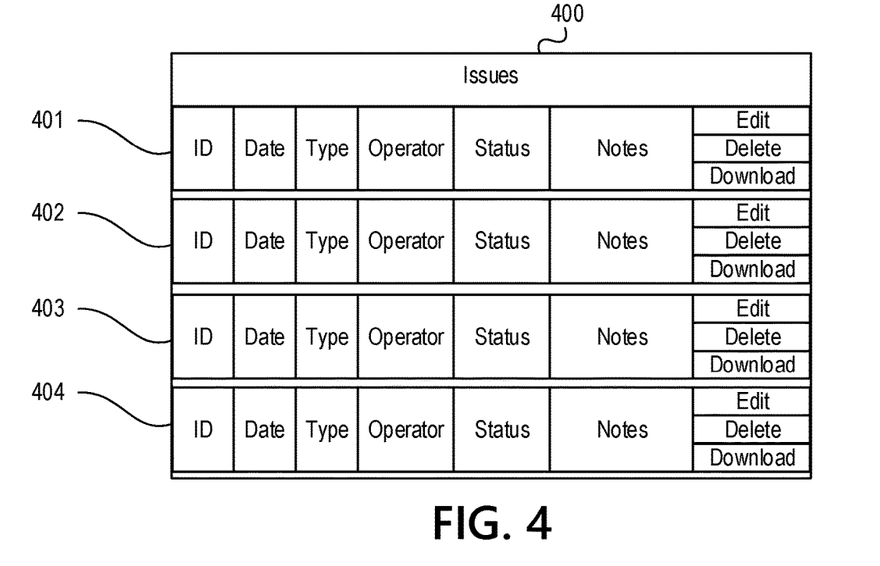
FIGS. 4 and 5 depict example graphical user interfaces for live reporting of check image keying issues in accordance with one or more example embodiments.
Figure 5:
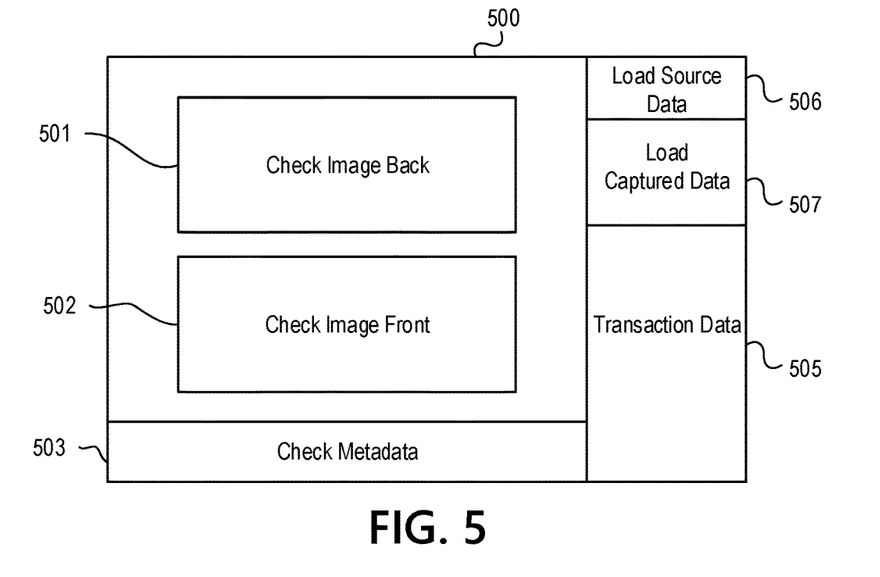

FIGS. 4-5 depict example graphical user interfaces for live reporting of check image keying issues in accordance with one or more example embodiments. FIG. 4 depicts an example graphical user interface 400 of the issue tracking module 115. In example graphical user interface 400, issue analysts such as engineering team members may manage the issues stored in issue database 116. For example, the illustrative graphical user interface 400 presents four stored issues 401-404 in issue database 116. For each issue, the user is able to, for example, edit, delete, or download the issue. Graphical user interface 400 also presents a summary of each issue, including but not limited to, for example, an identifier associated with each issue, the date and time that the issue was reported, the type or classification of the issue, the operator who submitted the issue, the status of the issue (e.g., "new," "researching," "resolved," and the like) and any notes associated with the issue. Through editing issues through graphical user interface 400, the engineering team may stay in communication with the operators of the check image keying computing device 120 to keep them abreast of any changes in the status of the issue, including resolution of the issue.

FIG. 5 depicts an example graphical user interface 500 of the issue tracking module 115. In graphical user interface 500, the engineering team member operating issue investigative computing device 130 is able to analyze the issue. In an embodiment, graphical user interface 500 contains several fields in common with graphical user interface 300. For example, graphical user interface 500 includes check images 501 and 502, check metadata 503, and transaction data 505. Check image 501 may be, for example, an image of the back of a check, and check image 502 may be, for example, an image of the front of the same check. Check metadata 503 may include, for example, routing and transit numbers, account numbers, transaction codes, amounts, serial numbers, or other data fields associated with the check transaction. Transaction data 505 may include, for example, the credits and debits to various accounts associated with the check transaction. In some embodiments, graphical use interface 500 is generated via at least some of the same programming instructions as graphical user interface 300. In addition to the elements of graphical user interface 300, however, graphical user interface 500 includes additional capabilities to facilitate the analyses of issues. For example, graphical user interface 500 includes a button 506 to load the source balancing data. Similarly, graphical user interface 500 includes a button 507 to load the operator affected balancing data. By alternately loading these two different sets of data, analyzing the difference between them, and using debugging tools, the business analyst operating issue investigative computing device 125 is able to analyze the issue accordingly. In an embodiment, the debugging tools available include web browser debugging tools for debugging web applications. The engineering team member is able to alternately load the operator affected balancing data and the source balancing data to understand the issue more clearly. In an embodiment, the difference between graphical user interface 500 and graphical user interface 300 is that graphical user interface 500, operated by an engineering team member investigating an issue, is not able to write to transaction database 114. Rather, graphical user interface 500 when accessed through a check image keying computing device 120 is operated in a segregated, or 'sandboxed' environment that does not allow writing data to the live operating environment.

Figure 6:
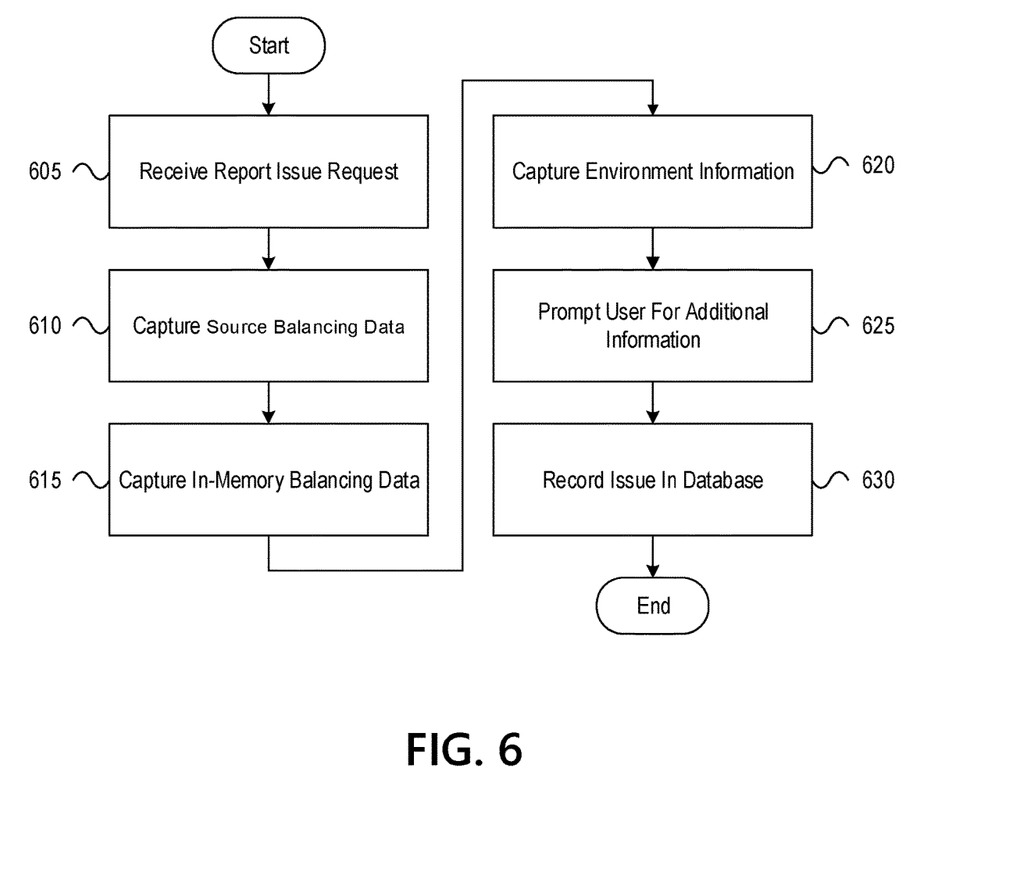
FIG. 6 depicts an illustrative method for live reporting of check image keying issues in accordance with one or more example embodiments.

FIG. 6 depicts an illustrative method for live reporting of check image keying issues in accordance with one or more example embodiments. Referring to FIG. 6, at step 605, a computing platform may receive a request to report an issue. This step may be in connection with, for example, the report issue button 304 of graphical user interface 300. Next, at step 610, the computing platform may capture the source balancing data. The source balancing data is the balancing data in the state it was in before the operator of check image keying computing device 120 began processing the data. Next, the computing platform may capture the in-memory balancing data at step 615. In an embodiment, the in-memory data is captured from a JavaScript object and serialized into a JSON format. At step 620, the computing platform may capture environment information. Environment information includes information such as, but not limited to, the operator name, the operator standard identifier, the operator email address. At step 625, the computing platform may prompt the user, or operator, for additional information. Additional information may include, for example, additional notes that the operator wishes to attach to the issue. Finally, at step 630, the computing platform may record the issue in a database such as issue database 116.

Figure 7:
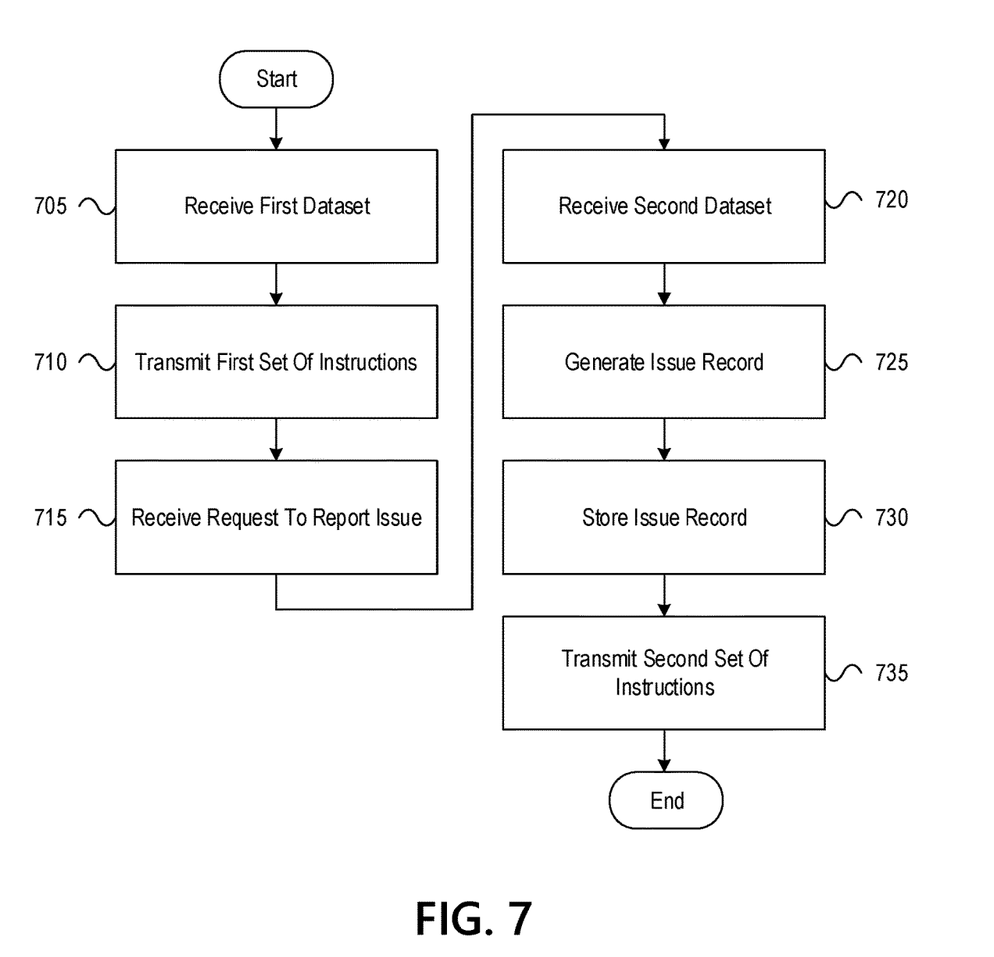
FIG. 7 depicts an illustrative method for live reporting of check image keying issues in accordance with one or more example embodiments.

FIG. 7 depicts an illustrative method for live reporting of check image keying issues in accordance with one or more example embodiments. Referring to FIG. 7, at step 705, a computing platform may receive a first dataset from a first database. For example, check image keying computing platform 110 may receive the first dataset from the transaction database 114 based on and/or as a result of the check image keying computing device 120 requesting a check transaction to balance. At step 710, check image keying computing platform 110 may transmit a first set of instructions to the check image keying computing device 120. At step 715, check image keying computing platform 110 may receive a request to report an issue from the check image keying computing device 120. For example, the request to report an issue may be based on or a result of an operator at the check image keying computing device 120 detecting an error or issue in the check balancing process. At step 720, check image keying computing platform 110 may receive a second dataset from the check image keying computing device 120. For example, the second dataset may include balancing data from the check image keying computing device 120 as a result of a user requesting to report an error or issue. At step 725, check image keying computing platform 110 may generate an issue record based on the first dataset and second dataset. At step 730, the issue record may be stored in the second database. For example, the issue record may be stored in issue database 116. At step 735, check image keying computing platform 110 may transmit a second set of instructions to a second client computer system. For example, the second client computer system may be issue investigative computing device 130, and the second set of instructions may be a second set of instructions for triggering issue investigation. In addition, at step 735, the check image keying computing platform 110 may transmit the issue record comprising the first dataset and the second dataset relating to the issue to the issue investigative computing device 130 for analysis.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing a first database, a second database, and computer-readable instructions that, when executed by the at least one processor, cause the computing platform to:
receive, from the first database, a first dataset;
transmit, via the communication interface, a first set of instructions for triggering transaction balancing and the first dataset to a first client computer system;
receive, via the communication interface, from the first client computer system, a request to report an issue;
receive, via the communication interface, from the first client computer system, a second dataset, wherein the second dataset relates to the issue;
generate, based on the first dataset and the second dataset, an issue record comprising the first dataset and the second dataset;
store the issue record in the second database; and
transmit, via the communication interface, to a second client computer system, a second set of instructions for triggering issue investigation and the issue record comprising the first dataset and the second dataset.

2. The computing platform of claim 1, wherein the first dataset includes balancing data identifying a collection of debits and credits to financial accounts, and at least one image of a check.

3. The computing platform of claim 1, wherein the second dataset includes balancing data identifying a collection of debits and credits to financial accounts, and at least one image of a check, the second dataset being representative of a state of the first client computer system at a time of the request to report an issue.

4. The computing platform of claim 1, wherein the first set of instructions includes instructions for generating a first graphical user interface to facilitate transaction balancing for financial transactions.

5. The computing platform of claim 4, wherein the first graphical user interface comprises a first plurality of graphical user interface elements and wherein the second set of instructions for triggering issue investigation includes instructions for generating a second graphical user interface to facilitate issue investigation, the second set of instructions comprising at least some of the same instructions as the first set of instructions, and the second graphical user interface comprising at least some of the first plurality of graphical user interface elements.

6. The computing platform of claim 1, wherein the second set of instructions for triggering issue investigation includes instructions for generating a second graphical user interface to facilitate issue investigation.

7. The computing platform of claim 6, wherein the second graphical user interface comprises a second plurality of graphical user interface elements and wherein the first set of instructions for triggering transaction balancing includes instructions for generating a first graphical user interface to facilitate financial transaction balancing, the first set of instructions comprising at least some of the same instructions as the second set of instructions, and the first graphical user interface comprising at least some of the second plurality of graphical user interface elements.

8. The computing platform of claim 1, wherein the memory stores additional computer-readable instructions that, when executed by the at least one processor, cause the computing platform to:
receive, via the communication interface, from the second client computer system, a communication; and
store the communication in the second database in association with the issue record.

9. The computing platform of claim 8, wherein the memory stores additional computer-readable instructions that, when executed by the at least one processor, cause the computing platform to:
  transmit the communication to the first client computer system via the communication interface.

10. The computing platform of claim 1, wherein the second client computer system does not have permission to write to the first database.

11. A method, comprising:
  at a computing platform comprising at least one processor, memory, a first database, a second database, and a communication interface:
    receiving, by the at least one processor, from a first database, a first dataset;
    transmitting, by the at least one processor, via the communication interface, a first set of instructions for triggering transaction balancing and the first dataset to a first client computer system;
    receiving, by the at least one processor, via the communication interface, from the first client computer system, a request to report an issue;
    receiving, by the at least one processor, from the first client computer system, a second dataset, wherein the second dataset relates to the issue;
    generating, by the at least one processor, based on the first dataset and the second dataset, an issue record comprising the first dataset and the second dataset;
    storing, by the at least one processor, the issue record in the second database; and
    transmitting, by the at least one processor, via the communication interface, to a second client computer system, a second set of instructions for triggering issue investigation and the issue record comprising the first dataset and the second dataset.

12. The method of claim 11, wherein the first dataset includes balancing data identifying a collection of debits and credits to financial accounts, and at least one image of a check.

13. The method of claim 11, wherein the second dataset includes balancing data identifying a collection of debits and credits to financial accounts, and at least one image of a check, the second dataset being representative of a state of the first client computer system at a time of the request to report an issue.

14. The method of claim 11, wherein the first set of instructions includes instructions for generating a first graphical user interface to facilitate transaction balancing for financial transactions.

15. The method of claim 14, wherein the first graphical user interface comprises a first plurality of graphical user interface elements and wherein the second set of instructions for triggering issue investigation includes instructions for generating a second graphical user interface to facilitate issue investigation, the second set of instructions comprising at least some of the same instructions as the first set of instructions, and the second graphical user interface comprising at least some of the first plurality of graphical user interface elements.

16. The method of claim 11, wherein the second set of instructions for triggering issue investigation includes instructions for generating a second graphical user interface to facilitate issue investigation.

17. The method of claim 16, wherein the second graphical user interface comprises a second plurality of graphical user interface elements and wherein the first set of instructions for triggering transaction balancing includes instructions for generating a first graphical user interface to facilitate financial transaction balancing, the first set of instructions comprising at least some of the same instructions as the second set of instructions, and the first graphical user interface comprising at least some of the second plurality of graphical user interface elements.

18. The method of claim 11, further comprising:
  receiving, by the at least one processor, via the communication interface, from the second client computer system, a communication; and
  storing, by the at least one processor, the communication in the second database in association with the issue record.

19. The method of claim 18, further comprising transmitting, by the at least one processor, the communication to the first client computer system via the communication interface.

20. One or more non-transitory computer-readable media storing instructions that, when executed by a computing platform comprising at least one processor, memory, a first database, a second database, and a communication interface, cause the computing platform to:
  receive, from the first database, a first dataset;
  transmit, via the communication interface, a first set of instructions for triggering transaction balancing and the first dataset to a first client computer system;
  receive, via the communication interface, from the first client computer system, a request to report an issue;
  receive, via the communication interface, from the first client computer system, a second dataset, wherein the second dataset relates to the issue;
  generate, based on the first dataset and the second dataset, an issue record comprising the first dataset and the second dataset;
  store the issue record in the second database; and
  transmit, via the communication interface, to a second client computer system, a second set of instructions for triggering issue investigation and the issue record comprising the first dataset and—the second dataset.

* * * * *

UNITED STATES PATENT AND TRADEMARK OFFICE
CERTIFICATE OF CORRECTION

PATENT NO. : 10,366,458 B2
APPLICATION NO. : 15/446798
DATED : July 30, 2019
INVENTOR(S) : William D. Arthur et al.

Page 1 of 1

It is certified that error appears in the above-identified patent and that said Letters Patent is hereby corrected as shown below:

In the Claims

On Column 14, Line 53:
In Claim 20, delete "and—the" and insert --and the--

Signed and Sealed this
Third Day of November, 2020

Andrei Iancu
*Director of the United States Patent and Trademark Office*